Jan. 29, 1952     I. W. BIANCHI     2,583,927
FLOWER DISPLAY PACKAGE
Filed Feb. 17, 1950
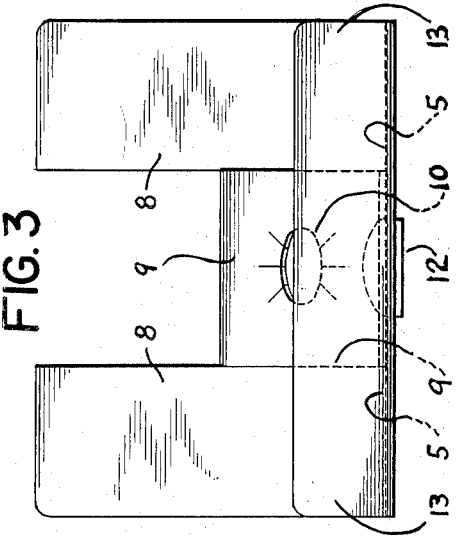
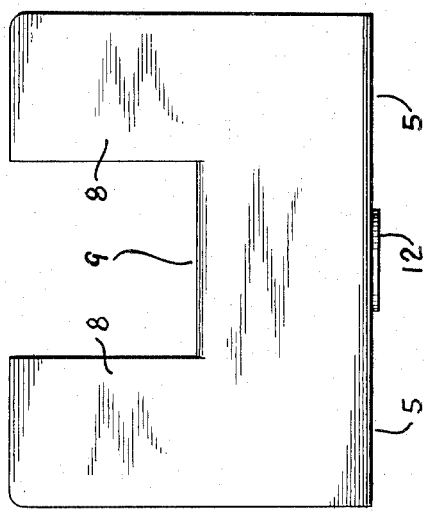
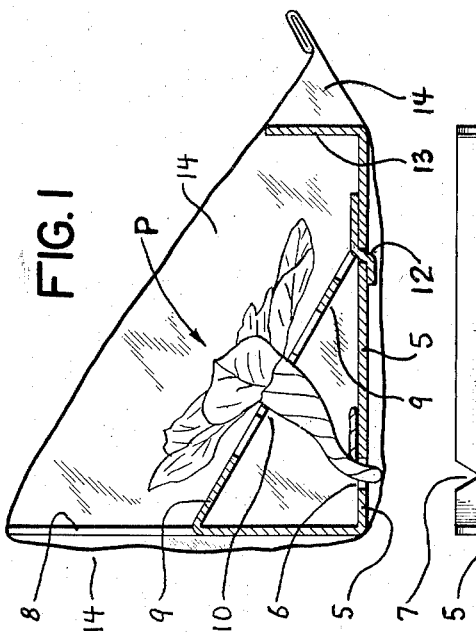
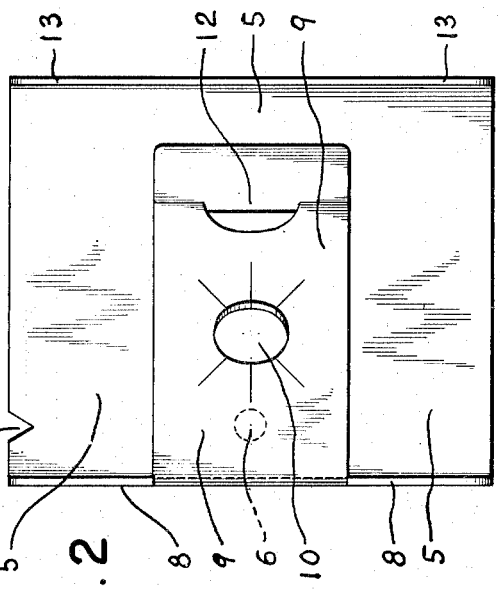
*INVENTOR.*
ICILIO W. BIANCHI
BY James C. Ledbetter
ATTORNEY Patented Jan. 29, 1952

2,583,927

UNITED STATES PATENT OFFICE 2,583,927

FLOWER DISPLAY PACKAGE

Icilio W. Bianchi, East Patchogue, N. Y., assignor to I. W. Bianchi, Inc., East Patchogue, N. Y., a corporation of New York Application February 17, 1950, Serial No. 144,780

1 Claim. (Cl. 206—45.33)

This invention relates to the handling of cut flowers and provides new and improved means for preserving and transporting them to market in a holder which is convenient for display and sales purposes. To these ends, I have provided a new flower tray of special utility for delicate and perishable blossoms.

In the production and marketing of cut flowers, such as camellias, gardenias and the like, it is desirable to mount them on an individual holder in order to pack a large number thereof in spaced relation and protected position within a box for shipment to the trade.

Thus, it is an object of the invention to provide a flower tray package which covers and protects the petals of the blossoms—preventing hand and packaging-material contact therewith—and affording a simple means for display and sale of the flowers in individual lots to a retail customer. My invention, therefore, prevents discoloration of perishable blossoms by positively protecting them against contamination while in transit from the grower to the trade and also against handling by a retail customer until he or she is actually ready to wear the flower.

The accompanying drawings with description and claim explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

Fig. 1 shows a mid-longitudinal section of a complete flower tray package assembly, that is, a prepared blossom (say a camellia or gardenia) display-mounted on the tray and placed in a transparent cover, such as a cellophane bag, the latter having a new protective relation with the flower in accordance with this invention.

The other three views omit the flower and transparent cover in the interest of showing the structural details of the tray, with its unique means for holding the bag in positive spaced relation from the perishable petals of the flower, as illustrated in Fig. 1.

Fig. 2 is a top view of the flower tray, while Fig. 3 is a front view, and Fig. 4 is a rear view thereof.

The drawings are made from a commercial specimen of the flower tray in use and thus show the size relations of the tray portions. Obviously, however, the size relations shown are not critical; they may be modified to suit one's packaging requirements without departing from the principle of the invention.

Further reference is made to the drawings illustrating one preferred example of the flower trays made from cardboard cut to pre-formed flat-lay blanks of generally rectangular shape having conventional crease lines and adapted to be folded by hand into the pattern shape illustrated.

It is seen that the tray comprises a flat base 5 which may be rectangular in shape and somewhat larger than a flower adapted thereto, as illustrated in Fig. 1. A flower stem receiving hole 6 is provided centrally of and near the rear of the base. Likewise, a flower stem receiving notch 7 may be formed or cut in either side edge of the base 5 in about the position shown relatively to the stem hole 6.

The rear of the flat base 5 has an upstanding wall carrying two spaced apart wings 8 reaching high above the base. The outer parallel edges of the two wings 8 may be parallel to and also in the same plane as the outer edges of the base. This structural relation is not critical and may vary.

A flower supporting seat, in the form of a tongue 9, has its rear end integral with the upstanding wall carrying the wings 8 and is disposed between them. A flower stem receiving aperture 10 is cut centrally in the tongue, provides a seat for a blossom calyx, and has radial slits of known form to free the hole and make it pliable or expansible to conveniently receive and hold different size (or over sized) flower stems. Note that the tongue 9 extends forward and downward at an angle to the plane of the flat base 5. Thus, the lower front end of the tongue reaches from the wings to the base.

A tab 12 of known form is made on the lower front end of the tongue and is tucked back through a slit in the base for holding the tongue in the angular position shown. The tongue 9, therefore, braces the rear-wall wings 8 in an upstanding position at the far end of the base 5 and contributes to rigidity of the lightweight cardboard tray.

Of importance to the invention is a characteristic upright flange 13 formed at the front end of the flat base 5 and forward of the flower supporting angular tongue 9. The height of this flange is much less than that of the wings 8 at the rear. The proportion shown affords excellent packaging. Note that the top horizontal edge of the front flange 13 is parallel with the plane of the flat base and may be on an approximate level with the flower seating aperture 10 in the tongue.

Preferably, the unique front flange 13 of this new flower tray, and the two rear wings 8, stand upright from the base 5 and may be in parallel relation. It will be noted that the upper edge of the front flange 13 and the upper edges of the two rear wings 8 are in a plane at an angle to the base 5, spaced high above the flower supporting tongue 9, and substantially parallel with the latter.

The usual practice, in preparing flowers for this tray (camellias and the like, having delicate petals P, see Fig. 1), is to mount a wire in the flower stem, or in substitution therefor, and then wrap the wired stem with tape in a conventional manner. The taped flower stem is inserted through the two holes 10 and 6, then bent underneath the base 5, upwardly around and into the notch 7, whereupon the free end of the stem is pressed down onto the upper side of the tray base 5. This leaves the free end of the stem at rest on the top side of the base, visible to a customer, and convenient for release when detaching the flower from the tray.

The foregoing method of mounting serves to seat the flower in place on the tongue 9. This packaging technique disposes the perishable delicate petals P of the flower in an attractive display position above the base 5, toward the front of the tray, and at a convenient viewing angle between the upstanding front and rear wall portions 13 and 8.

Next, the flower P and tray 5 assembly (Fig. 1) is placed in a transparent (cellophane) bag 14, as shown, with the rear end 8 of the tray at the bottom of the bag. The open mouth of the bag is then folded back toward the tray flange 13 to complete the package. The fold or roll-back of the bag 14 tensions toward the flange 13 and serves to brace it in upstanding position.

It is seen that the natural tendency of the bent-up flange 13 to spring back (flatten down) or return to its flat-blank position applies tension to the upper portion of the bag 14, thus taking up slack and preventing sagging toward the flower P. Thus packaged, it is significant that the upper side of the transparent sheet of the bag 14 is held taut and supported, from front to rear, high above the perishable flower petals P, by the upper horizontal edges of the two wings 8 and front flange 13.

In this new packaging, the cellophane bag does not jostle or sag loose and hence cannot settle down upon the flower, due to the adequate clearance space positively provided between the wrapper 14 and the petals P of the blossom. Significant, also, is the fact that this new packaging mode—its generous air space above the flower—maintains moisture-ladened air over the blossom to freshen it. Moistened cotton or other absorbent (not shown) is placed on the base 5 and around the mounted flower and its stem. It is found that flowers thus packaged and transported for long distances to market are not bruised, that they remain fresh, and retain their prime condition and original value, by reason of the new combination herein.

The display of the flower is much improved—for it is apparent that the upper side of the cellophane cover 14 is disposed in a plane parallel with that of the blossom lightly but firmly seated on the angular tongue 9. This arrangement is optically correct and poses the flower at an appropriate display or viewing angle perpendicular to the blossom.

While the drawings show this novel flower tray in its final form (folded from a blank), those conversant with the art will understand that the trays are manufactured from flat pre-cut cardboard to provide such "blanks." A plurality of the blanks is handled in a stack as a convenience for storage and to expedite packaging operations. The tray blanks are pre-formed with conventional crease lines defining the several "foldable" portions comprising the wings 8, tongue 9, its tab 12, and the front flange 13, as will be understood without illustrating a preformed flat blank in connection with this well known practice.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful flower tray. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

A flower package comprising a flat base, having a flower-stem receiving hole adjacent the rear end thereof, with a flange turned up vertically on the front end of the base preliminary to packaging a flower, upstanding spaced apart wings at the rear end of the base which are higher than the vertical flange; a flower-supporting tongue extending forward from between the wings, from a position below their upper edges, and at an angle downward to the base, with the front end of the tongue fastened to the base, and having a flower-calyx aperture; a flower having its stem inserted through the aperture and the hole, with the end of the stem bent under the flat base to hold said flower on the tongue; and a transparent bag enclosing the base and flower, said bag forming a cover contacting and extending from the top edge of the vertical flange to the top edges of the spaced apart wings, and supported thereby above and in spaced relation to said flower and substantially parallel to the tongue; and the transparent cover being held under tension by the spring-back tendency of the turned up vertical flange, to thereby maintain said cover taut against sagging into contact with the flower, and also to provide maximum space for moisture around the flower.

ICILIO W. BIANCHI.

REFERENCES CITED

The following references are of record in the file of this patent:

UNITED STATES PATENTS

| Number | Name | Date |
| --- | --- | --- |
| D. 111,709 | Levy | Oct. 11, 1938 |
| D. 159,658 | McCallum et al. | Aug. 8, 1950 |
| 1,923,452 | Neumiller | Aug. 22, 1933 |
| 2,035,021 | Pyle et al. | Mar. 24, 1936 |
| 2,197,506 | Moss | Apr. 16, 1940 |
| 2,459,565 | Lee | Jan. 18, 1949 |
| 2,479,910 | Davidson | Aug. 23, 1949 |